(12) United States Patent
Collins et al.

(10) Patent No.: US 10,246,348 B2
(45) Date of Patent: Apr. 2, 2019

(54) ULTRAVIOLET DISINFECTION SYSTEM

(71) Applicant: RayVio Corporation, Hayward, CA (US)

(72) Inventors: Douglas A. Collins, Hayward, CA (US); Li Zhang, San Ramon, CA (US); Yitao Liao, Redwood City, CA (US)

(73) Assignee: RayVio Corporation, Hayward, CA (US)

( * ) Notice: Subject to any disclaimer, the term of this patent is extended or adjusted under 35 U.S.C. 154(b) by 0 days.

(21) Appl. No.: 15/820,184

(22) Filed: Nov. 21, 2017

(65) Prior Publication Data

US 2018/0093904 A1 Apr. 5, 2018

Related U.S. Application Data

(63) Continuation-in-part of application No. 15/209,612, filed on Jul. 13, 2016, now Pat. No. 9,834,456, which is a continuation-in-part of application No. 14/733,494, filed on Jun. 8, 2015, now Pat. No. 9,540,252.

(51) Int. Cl.
*C02F 1/32* (2006.01)
*C02F 1/00* (2006.01)

(52) U.S. Cl.
CPC .............. *C02F 1/325* (2013.01); *C02F 1/001* (2013.01); *C02F 2201/009* (2013.01); *C02F 2201/326* (2013.01); *C02F 2201/3222* (2013.01); *C02F 2201/3228* (2013.01); *C02F 2303/04* (2013.01); *C02F 2305/10* (2013.01); *C02F 2307/02* (2013.01); *Y02A 20/212* (2018.01)

(58) Field of Classification Search
CPC .............. C02F 1/325; C02F 2201/3222; C02F 2201/3228; C02F 2201/326; C02F 2303/04; C02F 2307/02
USPC .......................... 250/453.11, 454.11, 455.11
See application file for complete search history.

(56) References Cited

U.S. PATENT DOCUMENTS

| | | | |
|---|---|---|---|
| 5,861,123 A | 1/1999 | Schiffner | |
| 5,919,422 A | 7/1999 | Yamanaka et al. | |
| 6,500,387 B1 | 12/2002 | Bigelow | |
| 6,773,608 B1 | 8/2004 | Hallett et al. | |
| 8,422,311 B1 | 4/2013 | Roberts et al. | |
| 9,617,171 B2* | 4/2017 | Rajagopalan | C02F 1/325 |
| 2002/0113022 A1* | 8/2002 | Gadgil | B01D 39/2068 |
| | | | 210/748.11 |
| 2003/0170151 A1 | 9/2003 | Hunter et al. | |
| 2010/0237254 A1 | 9/2010 | Mason et al. | |
| 2010/0314551 A1 | 12/2010 | Bettles et al. | |
| 2011/0267805 A1 | 11/2011 | Hua et al. | |
| 2011/0309032 A1 | 12/2011 | Makl | |
| 2012/0132947 A1 | 5/2012 | Krauter | |
| 2014/0263091 A1 | 9/2014 | Carter, III et al. | |
| 2015/0008167 A1 | 1/2015 | Shturm et al. | |

(Continued)

*Primary Examiner* — Nicole M Ippolito
(74) *Attorney, Agent, or Firm* — Patent Law Group LLP; Brian D. Ogonowsky (57) ABSTRACT

Embodiments of the invention include an elongate chamber. A UV source includes a semiconductor device, the semiconductor device including an active layer disposed between an n-type region and a p-type region. The active layer emits radiation having a peak wavelength in a UV range. The semiconductor device is positioned on a wall of the elongate chamber. An inner surface of the elongate chamber is reflective.

26 Claims, 8 Drawing Sheets

(56) References Cited

U.S. PATENT DOCUMENTS

| | | |
|---|---|---|
| 2015/0114912 A1 | 4/2015 | Taghipour |
| 2015/0129776 A1 | 5/2015 | Boodaghians et al. |
| 2015/0129777 A1 | 5/2015 | Nikamoto |
| 2015/0144575 A1 | 5/2015 | Hawkins, II |
| 2015/0174528 A1 | 6/2015 | Son et al. |
| 2015/0287894 A1 | 10/2015 | Toita et al. |
| 2015/0314024 A1 | 11/2015 | Khan et al. |
| 2015/0338336 A1 | 11/2015 | Dobrinsky et al. |
| 2015/0344329 A1 | 12/2015 | Smetona et al. |
| 2016/0107904 A1 | 4/2016 | Rajagopalan et al. |
| 2017/0166458 A1 * | 6/2017 | Rimbault .................. A23L 3/28 |

* cited by examiner

ULTRAVIOLET DISINFECTION SYSTEM

CROSS-REFERENCE TO RELATED APPLICATIONS

This is continuation-in-part of U.S. application Ser. No. 15/209,612, filed Jul. 13, 2016, which is a continuation-in-part of U.S. application Ser. No. 14/733,494, filed Jun. 8, 2015, issued as U.S. Pat. No. 9,540,252 on Jan. 10, 2017, assigned to the present assignee and incorporated herein by reference.

DESCRIPTION OF RELATED ART

Background

The bandgap of III-nitride materials, including (Al, Ga, In)—N and their alloys, extends from the very narrow gap of InN (0.7 eV) to the very wide gap of AlN (6.2 eV), making III-nitride materials highly suitable for optoelectronic applications such as light emitting diodes (LEDs), laser diodes, optical modulators, and detectors over a wide spectral range extending from the near infrared to the deep ultraviolet. Visible light LEDs and lasers can be obtained using InGaN in the active layers, while ultraviolet (UV) LEDs and lasers require the larger bandgap of AlGaN.

UV LEDs with emission wavelengths in the range of 230-350 nm are expected to find a wide range of applications, most of which are based on the interaction between UV radiation and biological material. Typical applications include surface sterilization, water purification, medical devices and biochemistry, light sources for ultra-high density optical recording, white lighting, fluorescence analysis, sensing, and zero-emission automobiles.

Figure 1:
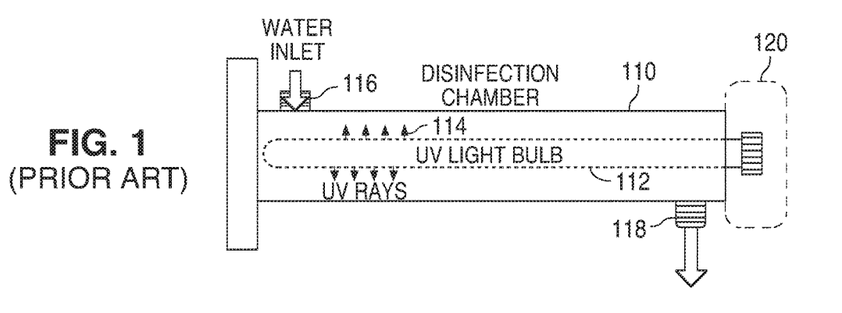
FIG. 1 is a cross sectional view of a prior art UV disinfection system.

UV radiation has disinfection properties that inactivate bacteria, viruses, and other microorganisms. A low-pressure mercury lamp may produce UV radiation in the range of 254 nm. Since most microorganisms are affected by radiation around 260 nm, UV radiation is in the appropriate range for germicidal activity. FIG. 1 illustrates a known UV treatment device. A cylindrical chamber 110 houses a UV bulb 112 along a central axis of the chamber 110. The bulb may be encased in a quartz sleeve. UV radiation 114 is emitted from the bulb 112. Untreated water enters the chamber at inlet 116, and flows toward outlet 118, where treated water may be removed from the chamber. A flow control device 120 may prevent the water from passing too quickly past the bulb, assuring appropriate radiation contact time with the flowing water. The chamber is stainless steel.

BRIEF DESCRIPTION OF THE DRAWINGS

Elements that are the same or similar in the various figures are labeled with the same numerals.

DETAILED DESCRIPTION

Though the devices described herein are III-nitride devices, devices formed from other materials such as other III-V materials, II-VI materials, Si are within the scope of embodiments of the invention. The devices described herein may be configured to emit UV A (peak wavelength between 340 and 400 nm), UV B (peak wavelength between 290 and 340 nm), or UV C (peak wavelength between 210 and 290 nm) radiation.

In embodiments of the invention, one or more UVLEDs are used in a disinfection device, suitable for disinfecting a fluid, such as water, air, or any other suitable material.

Figure 2:
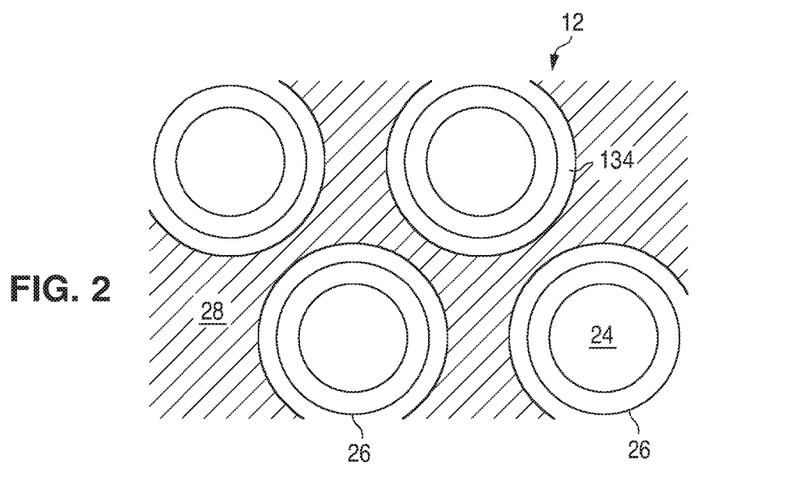
FIG. 2 is a plan view of multiple pixels in a flip chip UV-emitting device (UVLED).
Figure 3:
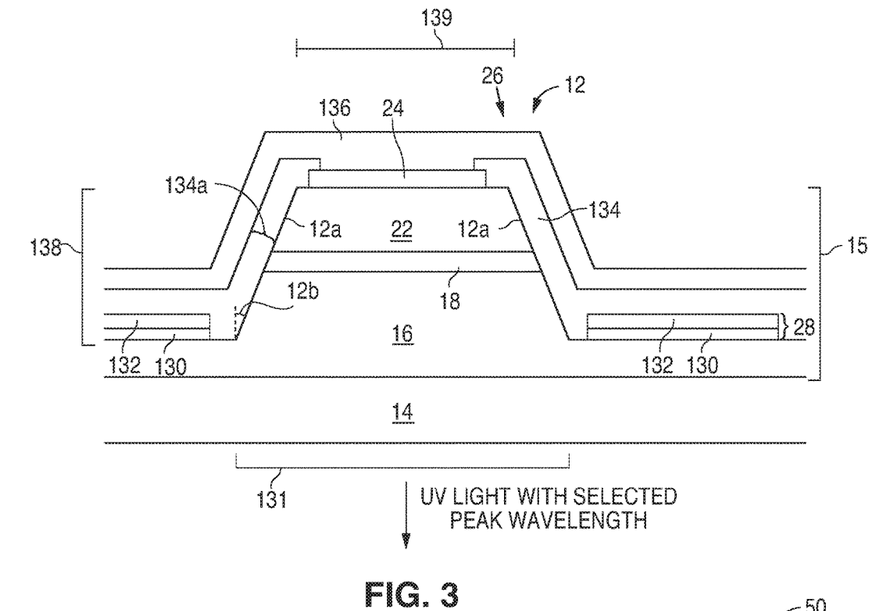
FIG. 3 is a cross sectional view of one pixel in the UVLED of FIG. 2.

Commercially available UVA, UVB, and UVC LEDs may be used in the various embodiments. FIGS. 2 and 3 are examples of the assignee's own UVB and UVC LEDs that may be used. FIG. 2 is a top down view of a portion of an array of UVLED pixels 12, and FIG. 3 is a bisected cross-section of a single UVLED pixel 12. Any suitable UVLED may be used and embodiments of the invention are not limited to the device of FIGS. 2 and 3.

The UVLEDs are typically III-nitride, and commonly GaN, AlGaN, and InGaN. The array of UV emitting pixels 12 is formed on a single substrate 14, such as a transparent sapphire substrate. Other substrates are possible. Although the example shows the pixels 12 being round, they may have any shape, such as square. The light escapes through the transparent substrate, as shown in FIG. 3. The pixels 12 may each be flip-chips, where the anode and cathode electrodes face the mount (described below).

All semiconductor layers are epitaxially grown over the substrate 14. An AlN or other suitable buffer layer (not shown) is grown, followed by an n-type region 16. The n-type region 16 may include multiple layers of different compositions, dopant concentrations, and thicknesses. The n-type region 16 may include at least one $Al_aGa_{1-a}N$ film doped n-type with Si, Ge and/or other suitable n-type dopants. The n-type region 16 may have a thickness from about 100 nm to about 10 microns and is grown directly on the buffer layer(s). The doping level of Si in the n-type region 16 may range from $1\times10^{16}$ cm$^{-3}$ to $1\times10^{21}$ cm$^{-3}$. Depending on the intended emission wavelength, the AlN mole fraction "a" in the formula may vary from 0% for devices emitting at 360 nm to 100% for devices designed to emit at 200 nm.

An active region 18 is grown over the n-type region 16. The active region 18 may include either a single quantum well or multiple quantum wells (MQWs) separated by barrier layers. The quantum well and barrier layers contain $Al_xGa_{1-x}N/Al_yGa_{1-y}N$, wherein $0<x<y<1$, x represents the AlN mole fraction of a quantum well layer, and y represents the AlN mole fraction of a barrier layer. The peak wavelength emitted by a UV LED is generally dependent upon the relative content of Al in the AlGaN quantum well active layer.

A p-type region 22 is grown over the active region 18. Like the n-type region 16, the p-type region 22 may include multiple layers of different compositions, dopant concentrations, and thicknesses. The p-type region 22 includes one or more p-type doped (e.g. Mg-doped) AlGaN layers. The AlN mole fraction can range from 0 to 100%, and the thickness of this layer or multilayer can range from about 2 nm to about 100 nm (single layer) or to about 500 nm (multilayer). A multilayer used in this region can improve lateral conductivity. The Mg doping level may vary from $1\times10^{16}$ cm$^{-3}$ to $1\times10^{21}$ cm$^{-3}$. A Mg-doped GaN contact layer may be grown last in the p-type region 22.

All or some of the semiconductor layers described above may be grown under excess Ga conditions, as described in more detail in US 2014/0103289, which is incorporated herein by reference.

The semiconductor structure 15 is etched to form trenches between the pixels 12 that reveal a surface of the n-type region 16. The sidewalls 12a of the pixels 12 may be vertical or sloped with an acute angle 12b relative to a normal to a major surface of the growth substrate. The height 138 of each pixel 12 may be between 0.1-5 microns. The widths 131 and 139 at the bottom and top of each pixel 12 may be at least 5 microns. Other dimensions may also be used.

Before or after etching the semiconductor structure 15 to form the trenches, a metal p-contact 24 is deposited and patterned on the top of each pixel 12. The p-contact 24 may include one or more metal layers that form an ohmic contact, and one or more metal layers that form a reflector. One example of a suitable p-contact 24 includes a Ni/Ag/Ti multi-layer contact.

An n-contact 28 is deposited and patterned, such that n-contact 28 is disposed on the substantially flat surface of the n-type region 16 between the pixels 12. The n-contact 28 may include a single or multiple metal layers. The n-contact 28 may include, for example, an ohmic n-contact 130 in direct contact with the n-type region 16, and an n-trace metal layer 132 formed over the ohmic n-contact 130. The ohmic n-contact 130 may be, for example, a V/Al/Ti multi-layer contact. The n-trace metal 132 may be, for example, a Ti/Au/Ti multi-layer contact.

The n-contact 28 and the p-contact 24 are electrically isolated by a dielectric layer 134. Dielectric layer 134 may be any suitable material such as, for example, one or more oxides of silicon, and/or one or more nitrides of silicon, formed by any suitable method. Dielectric layer 134 covers n-contact 28. Openings formed in dielectric layer 134 expose p-contact 24.

A p-trace metal 136 is formed over the top surface of the device, and substantially conformally covers the entire top surface. The p-trace metal 136 electrically connects to the p-contact 24 in the openings formed in dielectric layer 134. The p-trace metal 136 is electrically isolated from n-contact 28 by dielectric layer 134.

Robust metal pads electrically connected to the p-trace metal 136 and n-contact 28 are provided outside of the drawing for connection to power supply terminals. Multiple pixels 12 are included in a single UVLED. The pixels are electrically connected by large area p-trace metal 136 and the large area n-trace metal 132. The number of pixels may be selected based on the application and/or desired radiation output. A single UVLED, which includes multiple pixels, is illustrated in the following figures as UVLED 1.

In some embodiments, substrate 14 is sapphire. Substrate 14 may be, for example, on the order of hundreds of microns thick. In a 1 mm square UVLED 1 with a 200 µm thick sapphire substrate, assuming radiation is extracted from the top and sides of the substrate, the top surface accounts for about 55% of the extraction surface, and the sides account for about 45% of the extraction surface of the substrate. Substrate 14 may remain part of the device in some embodiments, and may be removed from the semiconductor structure in some embodiments.

The UVLED may be square, rectangular, or any other suitable shape when viewed from the top surface of substrate 14, when the device is flipped relative to the orientation illustrated in FIG. 3.

Figure 4:
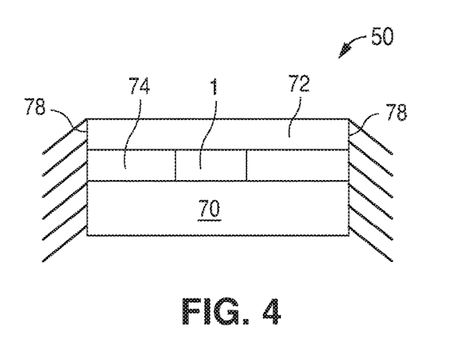
FIG. 4 illustrates a package including a UVLED and a transparent plate.
Figure 5:
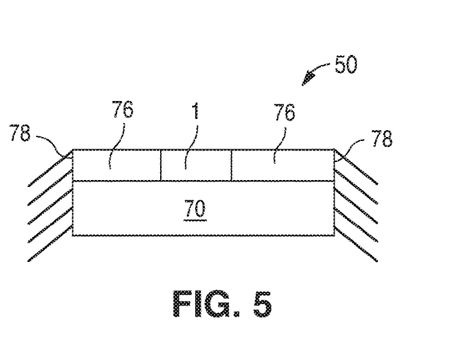
FIG. 5 illustrates a package including a UVLED and a sealing material.
Figure 6:
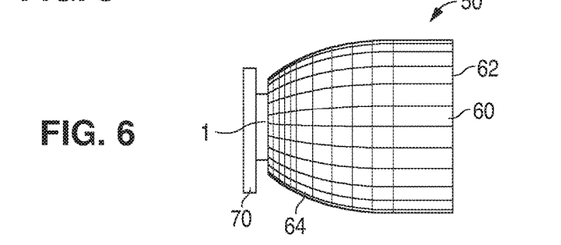
FIG. 6 illustrates a package including a UVLED and an optic.

The UVLED illustrated in FIGS. 2 and 3 may be disposed in a package. Three packages are illustrated in FIGS. 4, 5, and 6. In each package, UVLED 1 is attached to a mount 70. The mount 70 may be, for example, a ceramic mount, a circuit board, a metal-core printed circuit board, a silicon mount, or any other suitable structure. Circuit elements such as driver circuitry for UVLED 1 or any other suitable circuitry may be disposed on or within mount 70. In each of the packages illustrated in FIGS. 4, 5, and 6, more than one UVLED may be attached to mount 70. In each of the disinfection chambers described below, a single UVLED may be used, multiple UVLEDs disposed in a single package may be used, or multiple packages including one or more UVLEDs each may be used, in order to provide UV radiation sufficient for disinfection in the disinfection chamber.

In the package of FIG. 4, UVLED 1 is attached to mount 70. A transparent plate 72 is disposed over UVLED 1.

Transparent plate 72 may be quartz or any suitable material. UVLED 1 may be in direct physical contact with transparent plate 72 as illustrated in FIG. 4, in optical contact with transparent plate 72 by, for example, filling the space 74 between mount 70 and transparent plate 72 with an index matching material such as oil or any other suitable material, or spaced apart from transparent plate 72.

In the package of FIG. 5, UVLED 1 is attached to mount 70. UVLED 1 and empty space on mount 70 adjacent to UVLED 1 are covered with a material 76 that seals UVLED 1. Suitable sealing materials are UV-hard, transparent, and protect UVLED 1. Any suitable material, such as glass, may be applied by any suitable technique, such as a sol gel process. Sealing material over the top surface of UVLED 1 may be etched back to reveal the top surface of UVLED 1 (often the top surface of the grown substrate).

In the packages of FIGS. 4 and 5, in some embodiments, sidewalls 78 form a sealed chamber, such that UVLED 1 is isolated and protected from the fluid to be disinfected. For example, if the fluid is a liquid, the mount 70, sidewalls 78, and transparent plate 72 or sealing material 76 form a water-tight compartment in which UVLED 1 is placed. The sidewalls 78 may be walls of the disinfecting chamber, a metal or plastic container, or any other suitable structure.

In the package of FIG. 6, a UVLED 1 is attached to a mount 70, and an optic 60 is attached to the UVLED 1. The optic 60 may be any suitable optic, including for example, a dome lens, a Fresnel lens, the compound parabolic collimator illustrated, or any other suitable lens or optic. The optic 60 illustrated in FIG. 6 may create a radiation pattern that is more collimated than the radiation pattern emitted by the UVLED 1 without the optic 60. In some embodiments, the optic 60 is a compound parabolic collimator. UV radiation encountering curved sidewall 64 is reflected toward outlet surface 62. The optic 60 may be a solid, transparent material, that reflects UV radiation off sidewalls 64 by total internal reflection (TIR), or an open, hollow structure filled with air, with sidewalls that are formed from or coated with reflective material. In the case of an open structure, the outlet surface 62 may be simply an opening. A compound parabolic collimator may be more suited to an application where the UV radiation source is disposed on an end wall of an elongate disinfection chamber. A dome lens may be more suited to an application where the UV radiation source is disposed on a side wall of an elongate disinfection chamber.

Optic 60 may be a truncated inverted pyramid or cone. The outlet surface 62 of optic 60 may be, for example, rotationally symmetric, oval, round, square, rectangular, or any other suitable shape. The shape of the outlet surface 62 of optic 60 may be matched to the shape of the disinfection vessel. The surface of the optic 60 that is optically coupled to the top surface of the UVLED may be only slightly larger than the top surface of the UVLED; no more than 10% larger in some embodiments, no more than 20% larger in some embodiments, and no more than 30% larger in some embodiments. In some embodiments, a lens or other optic is disposed over UVLED 1, between the UVLED 1 and optic 60.

A solid optic 60 is formed from a material that is transparent to UV radiation at wavelengths emitted by UVLED 1, and able to withstand the UV radiation without degrading. For example, in some embodiments, the optic may be formed from a material that transmits at least 85% of UV radiation at 280 nm. The material may degrade no more than 1% after 1000 hrs of exposure to UV radiation at 280 nm. In some embodiments, optic 60 is formed from a material that is moldable, such as, for example, glass, IHU UV transmissive glass available from Isuzu Glass, Inc., and UV-resistant silicone. In some embodiments, optic 60 is formed from a material that may be shaped by, for example, grinding and polishing, such as quartz or sapphire. An optic formed by molding may be less expensive; an optic formed by grinding and polishing may be of better optical quality.

In some embodiments, optic 60 is optically coupled to only the top surface of the UVLED 1, typically a surface of the growth substrate, or a major surface of the semiconductor structure of UVLED 1. In some embodiments, optic 60 may extend over and be optically coupled to the sides of UVLED 1 as well. Optic 60 may extend over the sides of just the growth substrate, or over the sides of both the growth substrate and the semiconductor structure.

As illustrated in FIG. 6, in some embodiments, only the top surface of UVLED 1 is optically coupled to the optic 60. The side surfaces of UVLED 1 are not optically coupled to the optic, such that radiation emitted from the side surfaces is lost. Capturing the radiation from just the top surface increases the etendue of the UVLED/optic system. Increasing the etendue may increase the irradiance of the system and reduce the source size, which may be useful for some applications. The radiation emitted to the side is discarded in these embodiments, though in UV-emitting systems, radiation may preferentially be emitted toward the side surfaces of a UVLED, rather than the top surface of the UVLED, due to polarization within the AlGaN active layer(s).

In embodiments where the optic is a solid material that directs radiation by total internal reflection such as, for example, the optic illustrated in FIG. 6, the optic may have a TIR surface combined with other surfaces that may or may not direct radiation by TIR. For example, the TIR surfaces 64 of the optic illustrated in FIG. 6 may be combined with a domed surface spaced apart from UVLED 1, for example in place of flat output surface 62.

A UVLED 1 with an optic 60 may be used in a disinfection chamber as illustrated in FIG. 6, in either of the packages illustrated in FIG. 4 or 5, or in any other suitable package.

Figure 7:
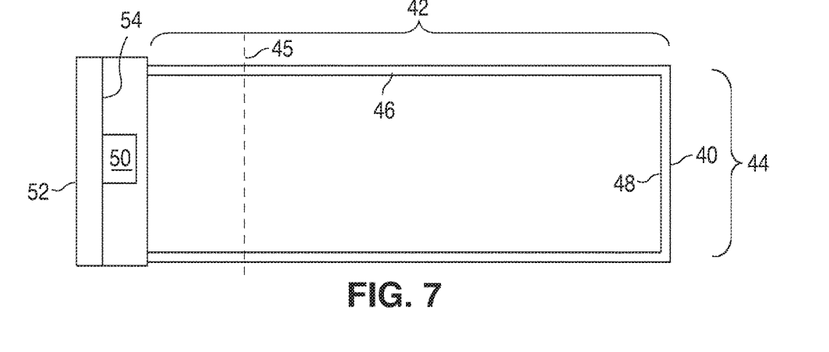
FIG. 7 is a cross sectional view of a batch-process UV disinfection system.

FIG. 7 is a cross sectional view of one embodiment of a disinfection device. The device of FIG. 7 includes a disinfection chamber 40. The disinfection chamber 40 is elongate; length 42 may be, for example, at least five times greater than width 44 in some embodiments, and no more than a hundred times greater than width 44 in some embodiments. The cross section at plane 45 may be circular, square, rectangular, hexagonal, or any other suitable shape.

UV radiation source 50 is disposed along at least one wall of the disinfection chamber. In the embodiment illustrated in FIG. 7, one UV radiation source 50 is disposed at one end of the elongate disinfection chamber 40, on one of the short walls of the disinfection chamber. In each of the disinfection chambers described herein, a single UV radiation source may be positioned on any wall of the disinfection chamber, or in any part of the disinfection chamber, or multiple UV radiation sources may be positioned on the same or multiple walls of the disinfection chamber. In some embodiments, a UV radiation source is positioned on a longer sidewall of the elongate chamber, rather than or in addition to on a shorter end wall of the elongate chamber. In some embodiments, UV radiation sources are positioned on both end walls of the disinfection chamber. In order to achieve a predetermined amount of UV radiation for disinfection at every point in the chamber, the use of two UV radiation sources at either end of the chamber may allow lower power UV devices to be used, as compared with a single UV radiation source positioned at one end, which must produce sufficient UV radiation at the opposite end of the chamber.

In the embodiment illustrated in FIG. 7, UV radiation source 50 may be disposed on what may be considered the top of the disinfection chamber. The surface 54 of the top 52 of the disinfection chamber that faces into the disinfection chamber may be formed from or coated with a UV-reflective material. The surface 48 of the bottom of the disinfection chamber (i.e., the short wall opposite the top) that faces into the disinfection chamber may be formed from or coated with a UV-reflective material. Surfaces 48 and 54 may have the same reflective coating, though this is not required. Examples of suitable reflective coatings for surfaces 48 and 54 include metals, silver, aluminum, Teflon, polytetrafluoroethylene (PTFE), barium sulfate, oxides, oxides of silicon including $SiO_2$, oxides of yttrium, oxides of hafnium, a multilayer stack, a distributed Bragg reflector, and combinations thereof.

The side surface(s) 46 of the elongate disinfection chamber 40 (i.e. the surface(s) perpendicular to the top and bottom surfaces described above) may be formed from or coated with a material that causes total internal reflection (TIR), or attenuated total internal reflection (ATR), where the material is reflective but somewhat absorbing, such that some power is lost when radiation is incident on the ATR material. A TIR material may be preferred in some embodiments for better reflection, but an ATR material may be used for other reasons such as cost, durability, compatibility with the fluid in the chamber, etc. In some embodiments, the elongate disinfection chamber is formed from a durable, inexpensive material such as plastic or polycarbonate, with the interior surface coated with a material that causes TIR or ATR. Examples of suitable coatings and/or materials for forming the disinfection chamber include materials that cause TIR of UV radiation and are not absorbing or substantially not absorbing such as Teflon, Fluorilon 99-U, and any of the materials listed above for coatings for surfaces 48 and 54. The disinfection chamber may be made from, for example, the examples of suitable coatings for the disinfection chamber and/or surfaces 48 and 54 listed above, plastic, metal, glass, or any suitable material.

In some embodiments, one or more surfaces of the disinfection chamber 40 that encounter water, such as the side surfaces or top and bottom surfaces described above may be coated with or otherwise treated with a photocatalytic material such as $TiO_2$. $TiO_2$ may photocatalyze water into OH radicals, which may purify water by breaking down organic material.

In some embodiments, the water disinfection device illustrated in FIG. 7 is used to disinfect fluid in a batch process. For example, the disinfection device may be a water bottle. The top 52 may be removable; for example the top 52 may be a screw-on lid, a clamp-on lid, or a structure secured to the disinfection chamber by any other suitable means. The top 52 may be removed, the disinfection chamber 40 filled with water, and the UV radiation source 50 activated, for example by pressing a button or flipping a switch (not shown in FIG. 7). The UV radiation source 50 may irradiate the water in the disinfection chamber 40 until, for example, automatically switched off or deactivated by a user. The top 52 may then be removed, and the disinfected water removed. In some embodiments, a single UV radiation source 50 may be disposed at the bottom of the water bottle, rather than the top, such that the water to be disinfected is in close enough proximity to the UV radiation source to act as a heat sink to the UV radiation source. In addition, placing UV radiation source 50 at the bottom of a water bottle, rather than the top, may reduce or eliminate losses associated with TIR at an air gap between the UV radiation source and the fluid, which may be caused by incomplete filling of the water bottle.

Figure 8:
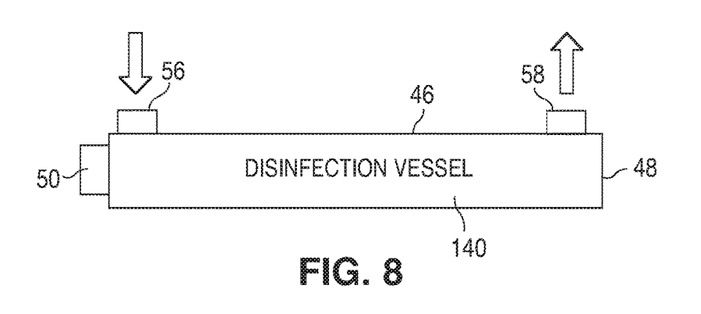
FIG. 8 is a cross sectional view of a continuous-flow UV disinfection system.

FIG. 8 is a cross sectional view of one embodiment of a water disinfection device, which may disinfect water in a continuous-flow process, rather in than a batch process like the device illustrated in FIG. 7. In the device of FIG. 8, the UV radiation source 50 is disposed at one end of the elongate disinfection chamber 140, as in FIG. 7, and irradiates the disinfection chamber 140 when activated. The top and bottom 48 ends of the elongate disinfection chamber 140 may be coated or formed from a UV reflective material, as in FIG. 7. The interior surface(s) 46 of the disinfection chamber 140 may be coated with a TIR or ATR material, as in FIG. 7.

In the device illustrated in FIG. 8, water to be disinfected flows into the disinfection chamber 140 through inlet 56. Water flows through the disinfection chamber 140 toward outlet 58, where the disinfected water flows out of the disinfection chamber 140. The device illustrated in FIG. 8 is not to scale; the disinfection chamber 140 may be much longer and the inlet 56 and outlet 58 spaced much further apart than illustrated in FIG. 8. For example, the disinfection chamber 140 may be at least 10 times longer than it is wide in some embodiments, at least 100 times longer than it is wide in some embodiments, and at least 500 times longer than it is wide in some embodiments. The disinfection chamber 140 is sufficiently long that the water spends enough time in the disinfection chamber to be exposed to sufficient UV radiation to disinfect the water.

Disinfection chamber 140 may be, for example a flexible plastic hose, or any other suitable material. In some embodiments, the inlet 56 (and the UV radiation source 50 in some embodiments) is submersible in a water body, such that a user may suck or pump water toward the outlet 58.

Unlike in the device of FIG. 1, where the UV source is disposed within the chamber such that UV radiation is emitted radially, in the device illustrated in FIGS. 7 and 8, the UV source 50 is disposed at one end of the chamber, such that radiation is emitted longitudinally, down the length of the elongate chamber.

Figure 9:
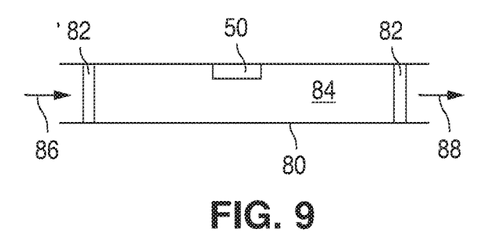
FIG. 9 is a cross sectional view of a continuous-flow UV disinfection system including a fluid permeable structure.

FIG. 9 is a cross sectional view of a continuous-flow disinfection chamber including a fluid-permeable structure such as a filter. In the device of FIG. 9, a disinfection chamber 84 is defined by elongate sidewalls 80, and filters 82 disposed on either end of chamber 84. Fluid enters at 86, flows through filter 82 into the chamber 84, then through a second filter 82, where it exits the chamber at 88. A UV radiation source 50 is disposed on sidewall 80, or at any other appropriate location. As in FIG. 8, the disinfection chamber may be flexible (such as, for example, a plastic tube), or rigid. The disinfection chamber is typically elongate, though it may be any suitable shape.

Filters 82 may be any suitable structure through which fluid may pass. Filters 82 may filter out some or all particulate matter in the fluid, though this is not required. Filters 82 may also be reflective of UV radiation, such that light emitted by UV radiation source 50 is trapped in chamber 84. Filters 82 may be any suitable material including, for example, porous aluminum, aluminum screens, or Teflon particles sintered into porous Teflon made by Porex, Inc. The length and diameter of chamber 84, the porosity of filters 82, the radiative power emitted by UV radiation source 50, and other characteristics may be selected such that at a predetermined flow rate, the fluid (e.g. air, water, or any other appropriate fluid) spends sufficient time in chamber 84 to disinfect the fluid.

In some embodiments, some or all of the walls of the chamber 84 may be coated with a photocatalytic material, as described above. Since photocatalytic disinfection requires close proximity between the fluid and the photocatalytic material, other structures coated with or formed from a photocatalytic material may be disposed in the chamber 84. In an embodiment including a photocatalytic material, the fluid may be disinfected three ways: mechanical filtering by filters 82, disinfection by UV radiation from UV radiation source 50, and disinfection by OH radicals created by the interaction of the photocatalytic material with UV radiation.

Figure 10:
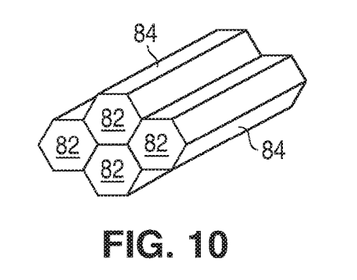
FIG. 10 illustrates multiple continuous-flow UV disinfection chambers in a close-packaged arrangement.

FIG. 10 illustrates multiple disinfection chambers 84, such as the one illustrated in FIG. 9, in a close-packed arrangement. Disinfection chambers may be added as necessary to reach a desired throughput of fluid. Though the individual disinfection chambers are hexagonal, to maximize the area of the disinfection chambers in cross section, the individual disinfection chambers may be any suitable cross section.

Figure 11:
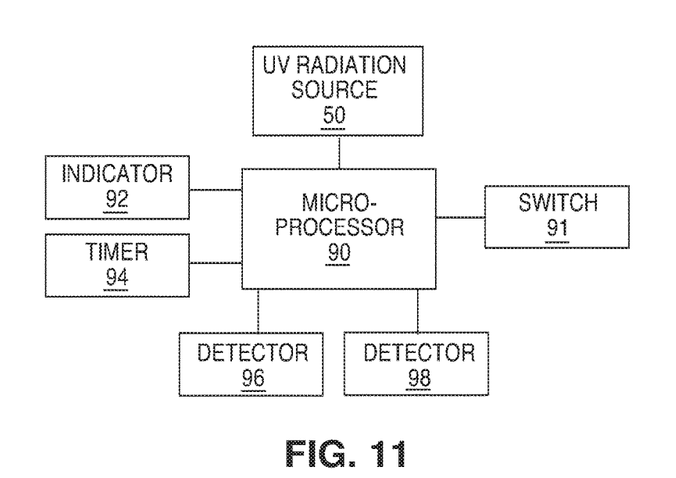
FIG. 11 is a block diagram of a circuit for controlling a UV disinfection system.

FIG. 11 is a block diagram of a circuit, which may control a UV radiation source in any of the disinfection chambers described above. Any suitable circuit may be used. Not all of the components illustrated in FIG. 11 are necessary in all embodiments. The components may be disposed on or in a mount, described above, and electrically connected to each other as illustrated via the mount, a circuit board, or any other suitable structure. UV radiation source 50 may be connected to a microprocessor 90, which may turn the UV radiation source 50 on and off, and may adjust the power to UV radiation source 50. A switch 91, which may be user-activated or automatic, and may be any suitable switch, may activate the UV radiation source directly (not shown in FIG. 11), or may activate the microprocessor, which turns on the UV radiation source.

The amount of time that the fluid is exposed to radiation from UV radiation source may be dictated by a timer 94, which may count a predetermined amount of time, after which the microprocessor 90 may turn off UV radiation source 50. An indicator 92, such as a light or any other suitable indicator, may indicate whether UV radiation source 50 is emitting UV radiation.

A detector 96 may detect an amount of UV radiation at a given point in the disinfection chamber. The amount of UV radiation emitted by source 50 may be adjusted accordingly by microprocessor 90. A second detector 98 may be used to detect whether the UV radiation source 50 is functioning properly. For example, first detector 96 may be positioned near UV radiation source 50, and second detector 98 may be positioned far from UV radiation source 50. When UV radiation source 50 is on, the amount of UV radiation detected by each of detectors 96 and 98 may be compared. If detector 96 indicates a higher amount of UV radiation and detector 98 indicates a lower amount of UV radiation, the fluid may be contaminated with particulate matter. If detectors 96 and 98 both indicate a low amount of UV radiation, the UV radiation source 50 may not be functioning properly. Indicator 92 may be used to indicate to a user that UV radiation source 50 is not functioning properly.

In one operation, a user activates switch 91. In response, microprocessor 90 turns on UV radiation source 50. Microprocessor 90 may also switch indicator 92 to a status indicating the UV radiation source is disinfecting. The amount of UV radiation is measured by detector 96. In response, microprocessor 90 may adjust the amount of time that the UV radiation source 50 stays on, and/or the power to UV radiation source 50, in order to deliver a sufficient dose of UV radiation to disinfect the fluid. Once the dose is reached, microprocessor 92 may switch off UV radiation source 50, and switch off indicator 92 or change indicator 92 to a status indicating the UV radiation source is finished disinfecting.

Figure 12:
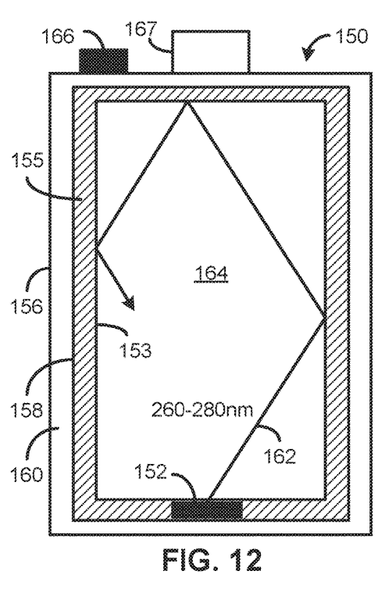
FIG. 12 is a bisected view of a water container with an integral UVC LED source at the bottom, where the light is reflected off the inner walls by TIR to disinfect the liquid.

FIG. 12 is a bisected view of a portable cylindrical water vessel 150 with one or more integral UVC LEDs 152 at the bottom, where the light is reflected off the inner walls 153 of the liner 155 by TIR to disinfect the liquid. TIR occurs when the incident light is at less than the critical angle of the interface. Between the outer wall 156, such as aluminum, and the next wall 158 there may be insulation 160 to keep the water cool. The light ray 162 emitted from the LEDs 152 assumes the vessel 150 is full of water 164. The LEDs 152 emit light in the UVC range 260-280 nm, which is the most effective range for killing microorganisms to disinfect the water. The UVC disrupts the cell walls and DNA of the microorganisms to essentially render them harmless.

Water has an index of refraction of about 1.35 for UV light near 280 nm. The liner 155 is preferably a molded polymer that has a smooth inner surface and an index of below about 1.33 (somewhat below that of water) to enable TIR to occur. A suitable polymer is MY-133-V2000, available from MY Polymers Ltd, or Topas' 8007 polymer available from Topas Advanced Polymers, GmbH. Other polymers with other suitable indices are also available. With TIR, there is essentially no reflective loss (reflectivity >99.5%), as compared to a reflective material such as a polished metal (reflectivity about 90-95%). The liner 155 is not considered a reflector and may be transparent. The UVC light continually reflects off the water/liner 155 interface until absorbed by the microorganisms or becomes attenuated by particles in the water 164.

Locating the LEDs 152 in the bottom, such as molded into the bottom of the polymer liner 155 for protection, enables the UVC light to always be reflected within any amount of water and at the top air/water interface. In another embodiment, the UVC LED 152 is encapsulated within a lens and affixed to an inner wall of the liner 155 to minimize waveguiding within the liner 155. If the UVC LED 152 is affixed to the inner wall of the liner 155, any electrical connection to a power source may be made by running conductors through a sealed hole in the liner 155.

The outer wall 158 of the liner 155 may be a deposited reflective metal film 158 over the polymer, such as aluminum, chrome, or silver, to reflect back any light that was above the critical angle and passed through the transparent polymer liner 155. To mitigate the effects of waveguiding within the transparent polymer liner 155, the outer surface may include molded prisms or roughening to cause the reflected light to be at a wide variety of angles to increase the percentage of UVC light that is reflected back into the water 164.

A dose of 2000-8000 $\mu W \cdot s/cm^{-2}$ is known to kill the target microorganisms.

A small controller circuit 166 includes a replaceable battery, a switch, and a timer. A solar cell may also be included for recharging the battery. Once the user fills the vessel with water, such as from a stream, the user presses the switch, and power is applied to the LEDs 152 for a predetermined time deemed needed to kill the microorganisms. The timer may be settable, depending on the source of the water. Alternatively, the LEDs 152 are automatically energized whenever the controller circuit 166 senses that the cap 167 has been opened then closed. A dosage detector may also be incorporated in the vessel to measure the cumulative amount of UVC energy supplied to the water. After a threshold is reached, the dosage detector controls the UVC LEDs to turn off. FIG. 11 illustrates a possible embodiment of the controller circuit 166.

Figure 13:
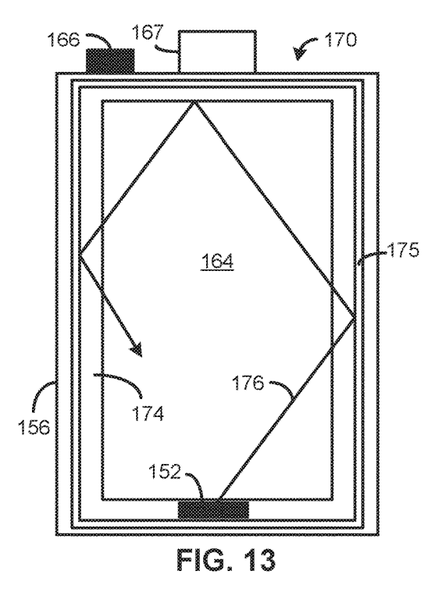
FIG. 13 is a bisected view of a water container with an integral UVC LED source at the bottom, where the light is reflected off an air/gap interface by TIR to disinfect the liquid.

FIG. 13 is a bisected view of another portable cylindrical water vessel 170 with an integral UVC LED source 152 at the bottom, where the light is reflected off an air/gap interface by TIR to disinfect the liquid. An outer wall 156 may be aluminum. Between the outer wall 156 and the transparent polymer liner 174 is an air gap 175 (index of refraction about 1). The liner 174 may be the same polymer described with respect to FIG. 12 except that the outer wall of the liner 174 is not covered by a reflective material, since the reflection off the outer wall of the liner 174 is by the more efficient TIR. A light ray 176 from the LEDs 152 is shown reflecting off the air/liner 174 interface by TIR. Light is also reflected off the inner wall of the liner 174 by TIR, as shown in FIG. 12. The aluminum outer wall 156 may have a polished inner surface to reflect light that passed through the liner 174 back into the water 164.

Figure 14:
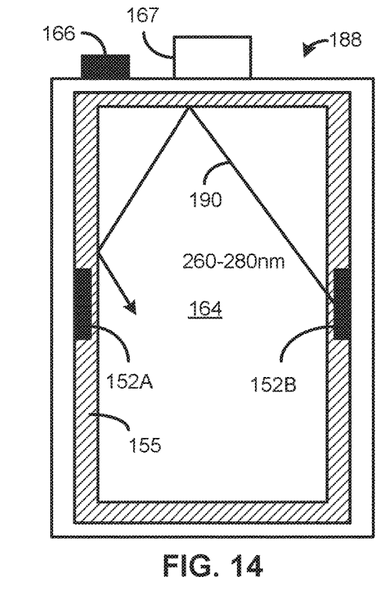
FIG. 14 is a bisected view of a water container with an integral UVC LED source, similar to FIG. 12 but where the UVC LED(s) are located around the side walls of the vessel.

FIG. 14 is a bisected view of a water vessel 188 similar to that of FIG. 12 but where the LEDs 152A and 152B are located within the side walls of the transparent liner 155. LEDs 152 may also be at the bottom. Adding LEDs in different locations allows more UVC coverage within the vessel, which reduces the required time for disinfection. A UVC light ray 190 is shown.

This technique of mounting the LEDs 152A and 152B on the side walls and using TR may be also used when the vessel is a pipe that transports water between an input and an output, such as shown in FIGS. 8-10. The embodiments of FIGS. 14 and 15 may easily be converted to pipe portions that are used to disinfect water running through the pipe.

Figure 15:
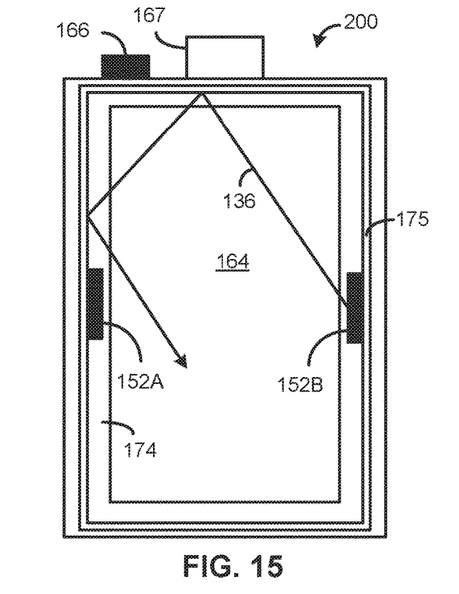
FIG. 15 is a bisected view of a water container with an integral UVC LED source, similar to FIG. 13 but where the UVC LED(s) are located around the side walls of the vessel.

FIG. 15 is a bisected view of a portable water vessel 200 similar to that of FIG. 13 but where the LEDs 152A and 152B are located within the side walls of the transparent liner 174. The TIR and other reflection features are the same as in FIG. 13.

Figure 16:
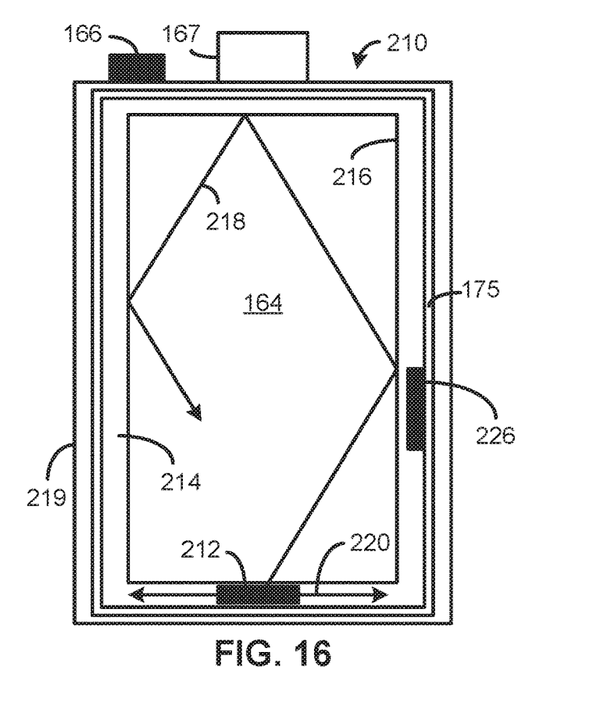
FIG. 16 is bisected view of a water container where light from a UVC LED is injected into the water to disinfect the water and also injected into a transparent liner for exposing microbial growth on the liner wall to the UVC light.

FIG. 16 is bisected view of a water vessel 210 where light from a UVC LED 212 is injected into the water 164 to disinfect the water 164 and also injected into a transparent liner 214 for exposing microbial growth on the liner wall 216 to the UVC light. The liner 214 may be glass having a reflective or partially reflective inner wall or outer wall. The UVC rays 218 injected into the water 164 reflect off the inner or outer wall of the liner 214 until absorbed by the water or the reflective material. Some of the side light 220 from the UVC LED 212, or from a separate UVC LED, is directly injected into the liner 214 and is internally reflected somewhat within the liner 214 by TIR, assuming the index of refraction of the glass liner 214 is greater than that of the water (n=1.33) and the outer air gap 175 (n=1) between the liner 214 and the outer shell 219. Since light is injected into the liner 214 at a low angle, much of the light will be internally reflected by TIR at least by the air gap 175. Any microbial growth on the inner wall of the liner 214 will intercept a light ray and cause that light to be extracted from the liner 214 to the microbial growth to kill the growth. The UCV light injected into the water 164 will also kill the microbial growth on the liner 214. In some cases, a separate UVC LED is used for injecting the light into the liner 214, and such a UVC LED may need to be on for a longer time than the UVC LED 212 if there is microbial growth on the liner 214. The UVC LED 212 that disinfects the water 164 may be separately controlled to be on as long as necessary to disinfect the water 164. The outer reflector for the liner 214 may be a reflective metal film or an air gap 175 (for TIR). The UVC LEDs may be located on the inner wall of the liner 214 or sealed in a cavity in the liner 214.

An optical detector 226 may be used to detect the UVC light. The detector 226 may be used to detect if the UVC LED 212 is operating and may give feedback on the power level. This information is then provided to the controller circuit 166 to warn the user and control the exposure time. Wires may be sealed, such as metal traces encapsulated by a ribbon tape, and run along the inner or outer wall of the liner 214 between the electronic devices and the controller circuit 166.

If the liner 214 has a reflective inner wall, the inner wall may be opaque. The UVC LED 212 and detector 226 must then have a window through the opaque reflective material or extend through the wall. If the liner 214 is transparent and the light rays in the water 164 are internally reflected by TIR, the UVC LED 212 and detector 226 may be within the liner 214 or external to the liner 214.

Figure 17:
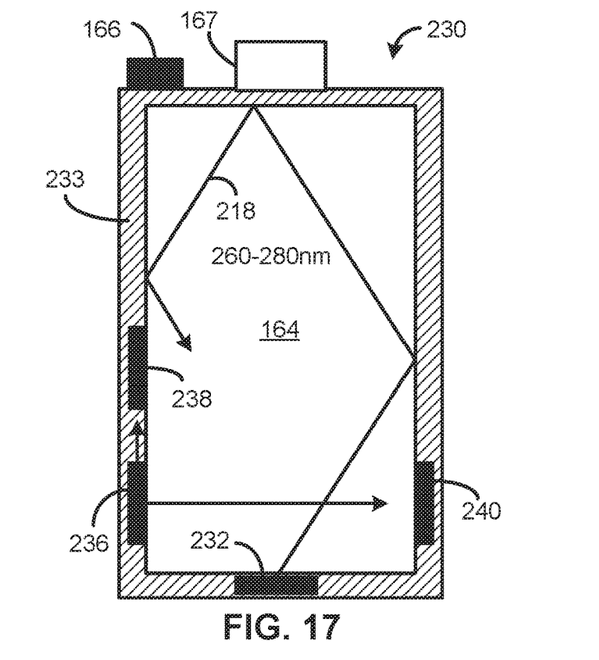
FIG. 17 is a bisected view of a water container where light from a UVC LED is reflected off walls of the container and where a first detector detects direct light from the UVC LED and a second detector detects the UVC LED light after being attenuated by the water, in order to detect the transparency of the water, which is related to the density of attenuating particles (including microbes) in the water. Non-UV LEDs (e.g., 600 nm LEDs), whose wavelengths may be better absorbed by microbes, may instead be used to detect the density of the microbes.

FIG. 17 is a bisected view of a water container 230 where light from a UVC LED 232 is reflected off inner walls of the container shell 233 to disinfect the water 164. The UVC LED 232 injects light from the bottom to ensure the light enters any volume of water 164. The container shell 233 may be formed of stainless steel and the inner surface is polished. A separate liner with a reflective wall may be instead used to contain the water 164. An additional LED 236 is shown injecting light through the water 164 from a side wall. A first optical detector 238 detects direct light from the LED 236, which is not attenuated by the water 164, and the resulting signal is used as a baseline signal. The first optical detector 238 may detect side light from the LED 236. A second optical detector 240 detects the LED 236 light after being attenuated by the water 164, in order to detect the density of attenuating particles (including microbes) in the water 164. Non-UV LEDs (e.g., 600 nm), whose wavelengths are better absorbed by microbes (e.g., fecal matter), may be used as the LED 236, since the LED 236 is not required to disinfect the water 164. In such a case, the detectors should not be sensitive to the UVC light from the UVC LED 232. The signals from the two detectors 238 and 240 are detected by the controller circuit 166, and the difference relates to the transparency of the water 164. The controller circuit 166 uses this feedback information to control the length of time the UVC LED 232 is on to sufficiently kill the microbes to increase the transparency of the water 164 until a threshold transparency is achieved. A warning signal to the user, such as the illumination of a red LED on the outside of the container 230, may indicate to the user that the water 164 is not sufficiently transparent for drinking.

Since the second optical detector 240 is located above the bottom of the vessel, inert particulates in the water 164 may settle on the bottom surface of the vessel and no longer affect the transparency of the water. Microbes do not settle to the bottom due to colloidal suspension.

Additionally, when the water 164 is fairly opaque from impurities, whether microbial or not, the UVC LED 232 must be on longer to sufficiently expose the suspended microbes to the UVC radiation. Therefore, the controller circuit 166 may use the detection of water transparency to extend the on-time of the UVC LED 232 based on the opaqueness of the water 164. A look-up table may be used to correlate the on-time with the opaqueness of the water to adequately disinfect the water. The effectiveness of the UVC light in killing the microbes is dependent on the dose of the UVC radiation, which is generally calculated as power per unit area multiplied by the time of exposure. The controller circuit 166 may adjust the power or on-time to deliver the required dose of UVC radiation.

A porous filter provided at the input of the vessel may be used to filter out larger particles that cloud the water and make it difficult to expose microbes to the UVC radiation.

The optical detectors may also be used to measure the inherent degradation of the UVC LED 232 over time to allow the controller circuit 166 to compensate for such degradation by increasing the UVC LED current or on-time to deliver the desired dosage.

In another embodiment, the detectors 238 and 240 detect the UVC light from the UVC LED 232 to determine the transparency of the water 164 to the UVC light. The detectors 238 and 240 may also be used to determine if there is a malfunction where the UVC LED 232 does not turn on. The detectors 238 and 240 may also sense whether the vessel has been opened to ambient light and then turn off the UVC LED 232 for safety.

In either of the embodiments using the two optical detectors, the difference in the optical path lengths from the "water transparency detecting" LED to the two separate detectors should be greater than 2× in order to adequately detect the baseline LED power and compare it to the transparency signal. In one embodiment, both detectors detect LED light that passes through a portion of the water, but if the optical path between the baseline detector and the LED is much smaller than the optical path between the transparency detector and the LED, the difference in detection signals can be used to calculate the transparency of the water.

In another embodiment, multiple wavelength LEDs may be used, where the wavelengths are selected based on the type of microbes to be detected. Optical absorption of 600 nm light is a well know technique used to estimate the density of bacteria in a fluid sample.

The controller circuit 166 may periodically energize the various LEDs, such as from 0.5 to 5 minutes per hour.

The disinfection systems may be used for personal water bottles or for much larger vessels. The water may be stagnant or moving.

The concept of using optical detectors to detect absorption of light, of any wavelength, by the water for sensing the transparency (cleanliness) of the water, or for any other purpose, may be applied to any of the other water vessel designs disclosed herein, such as vessels in industrial applications for disinfecting water, where the water continuously flows into and out of the vessel. The detectors may have a sealed face that is in contact with the water, or the liner may be transparent and the detectors are on the outside of the liner.

Figure 18:
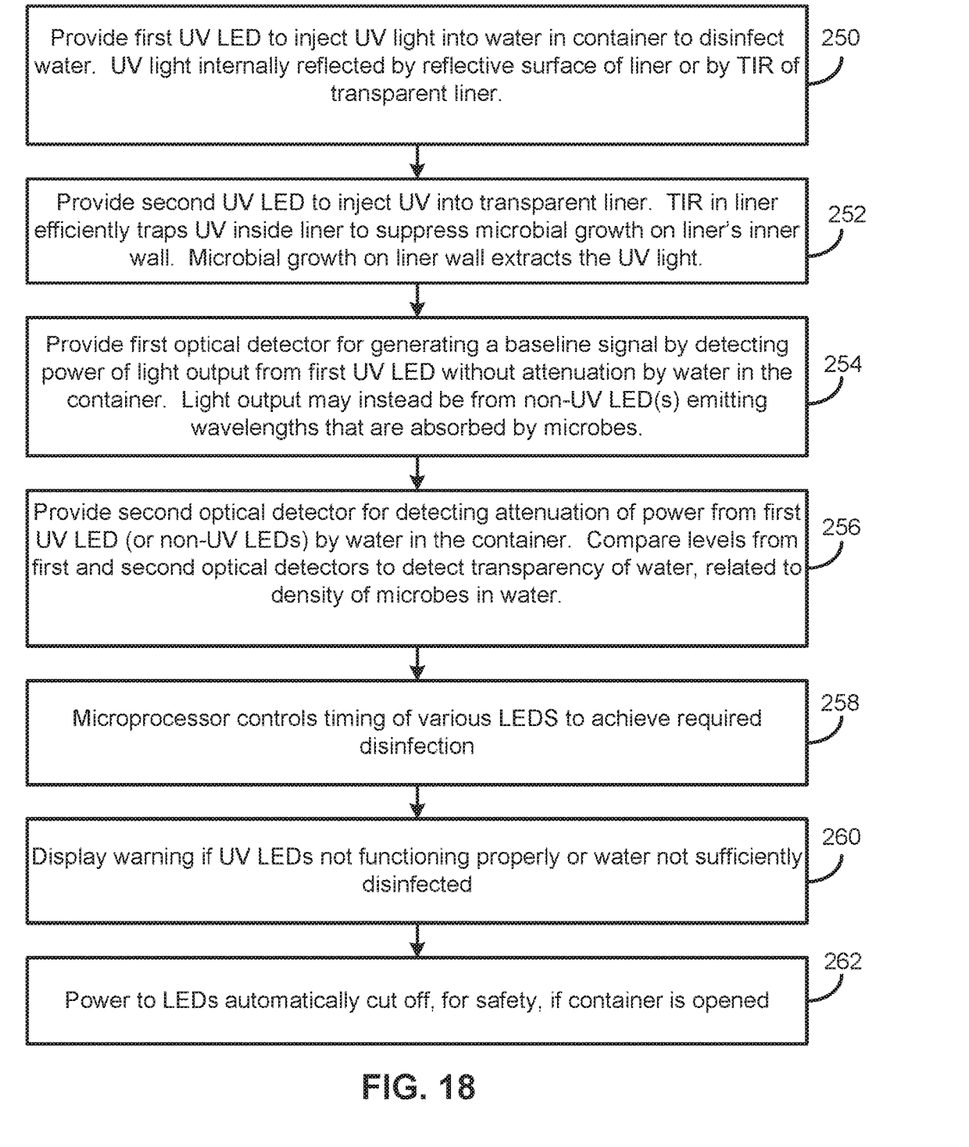
FIG. 18 is a flowchart identifying various steps employed in one embodiment of the water container using UVC LEDs.

FIG. 18 is a flowchart identifying various steps employed in one embodiment of the water vessel using UVC LEDs. Some other embodiments may delete one or more steps. In step 250, UV light is injected into the water and reflects off the walls of the liner or container inner wall. In step 252, a second UV LED injects light into a transparent liner to disinfect the walls of the liner. In step 254, a first optical detector detects the UV light or other wavelength light as a baseline. In step 256, a second optical detector detects light from the LED to determine the attenuation by the water. The signals from the two detectors are then used to determine the density of microbes in the water. In step 258, the feedback information is used by a microprocessor in the controller circuit to control the UVC dosage for achieving disinfection of the water. In step 260, based on the optical feedback signals, a warning is displayed for non-functioning LEDs or if the water is not sufficiently disinfected. For example, a red LED on the controller circuit may be illuminated to indicate a warning, and a green LED may be illuminated to indicate that the water is sufficiently disinfected for drinking. In step 262, the power to the LEDs is cut off if the container is opened, such as if a detector detects ambient light.

Figure 19:
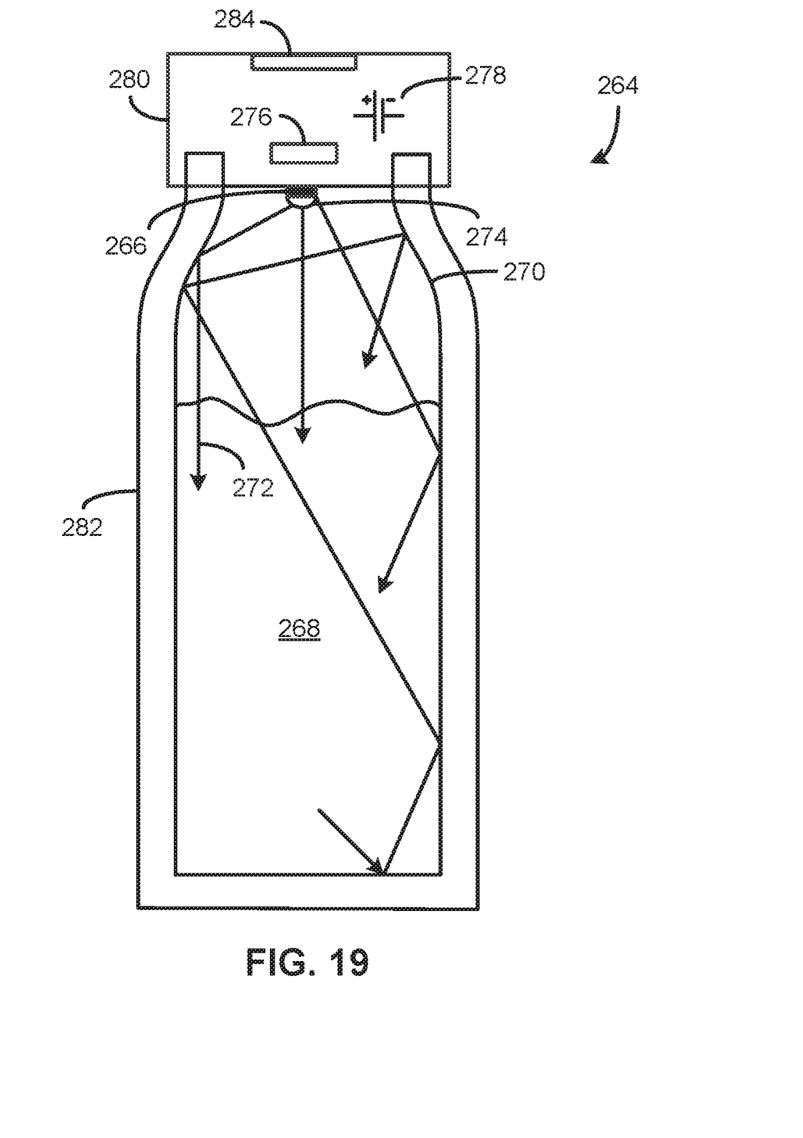
FIG. 19 is a bisected view of a generally cylindrical water bottle containing a UVC LED and water, where the reflective inner walls of the bottle are shaped to direct the UVC light into the water.

FIG. 19 is a bisected view of a generally cylindrical water bottle 264 containing a UVC LED 266 and water 268, where the reflective inner wall 270 of the bottle 264 is shaped to direct the UVC light rays 272 into the water 268. A lens 274 emits a generally Lambertian distribution of the UVC light in the direction of the water 268 and the inner wall 270. The UVC LED 266, controller circuit 276, battery 278, and any other circuitry may be located in the removable cap 280. The inner wall 270 is reflective, such as polished stainless steel or glass having an outer reflective film layer. The inner wall 270 is insulated from the protective outer shell 282, such as by a layer of foam.

The inner wall 270 has a generally parabolic shape near the UVC LED 266 to direct impinging rays 272 downward into the water 268 or toward another area of the inner wall 270 for directing the rays 272 downward. The UVC LED 266 may be positioned such that light emitted substantially horizontally impinges on the curved portion of the inner wall 270 for directing all light downward.

The shape of the inner wall 270 is shown conforming to the shape of the outer shell 282 but the two shapes may be independent. Therefore, the inner wall 270 may be optimized for reflection, while the outer shell 282 may be optimized for other purposes.

A push button switch 284 on the top of the cap 280 automatically turns on the UVC LED 266 for 60 seconds. This will typically remove 99.9999% of all biological contaminants in the water 268. Other on-times may be settable. The battery 278 may be recharged via a USB port in the cap 280.

Based on simulations performed by the inventors, the curved inner wall 270 can reduce the needed power of the UVC LED 266 by 40-60% due to the efficient recycling of the light. The bottom of the cap 280 may also be reflective.

The general size of the bottle 264 may be similar to a conventional water bottle. The various other features described in other figures may be incorporated into the bottle 264 of FIG. 19. The feedback detectors of FIG. 17 may be added if the water bottle is to disinfect non-tap water, such as water from a river, where the disinfection time may vary.

Figure 20:
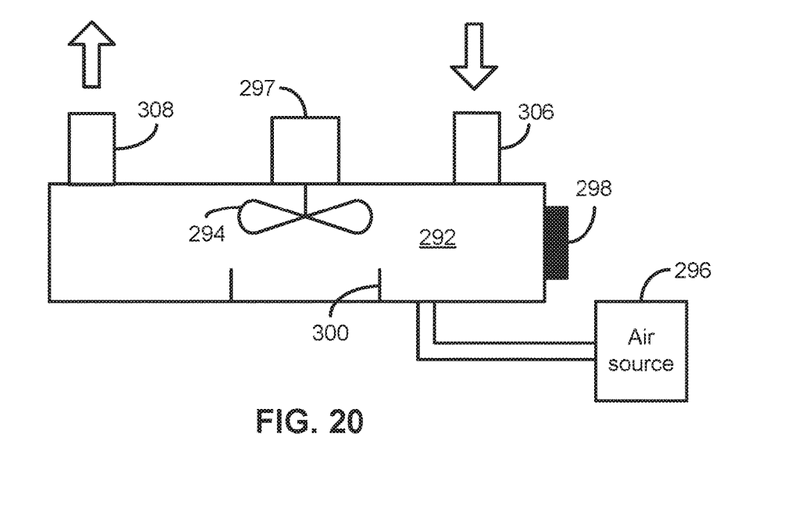
FIG. 20 is a bisected view of a water purifier where the water is agitated by blades and/or bubbles to better disinfect the water.

FIG. 20 is a bisected view of a water purifier 290 where the water 292 is agitated by motor-driven rotating blades 294 and/or bubbles from an air source 296 to better disinfect the water 292. The motor 297 speed may be adjustable. The agitation more uniformly exposes the water 292 to the UVC light from the UVC LED 298. Other UVC LEDs may be positioned in different areas, such as at each end. The purifier 290 may be transparent or stainless steel. If stainless steel, a sealed window allows the UVC light to enter. Baffles 300 are used to further agitate the water. The baffles 300 may be transparent or reflective to reduce absorption inside the vessel. An input port 306 and output port 308 are shown.

It is known that turbulent water allows better exposure to UVC light for disinfection. However, the combination of a mechanical stirrer and bubbles concurrently introduced by an air source has been found by the inventors to have a synergistic effect in exposing the water to the UVC light. The advantage of forming bubbles in water for disinfection with UV light is described in the book entitled, The Ultraviolet Disinfection Handbook, by Bolton et al., American Water Works, 2008, page 85. The known prior art uses either agitation or the introduction to bubbles, combined with UV light, but not both simultaneously. The bubbles, introduced at the bottom, tend to rise quickly and then become ineffective as the air escapes the water at the top. By simultaneously stirring the water from the top, the bubbles are effectively recycled by being pushed downward by the stirrer, so less air needs to be injected to have the same effect.

In the case of a sealed personal water bottle, introducing air is not viable unless an air outlet is provided. However, a motorized stirrer can still be used.

Figure 21:
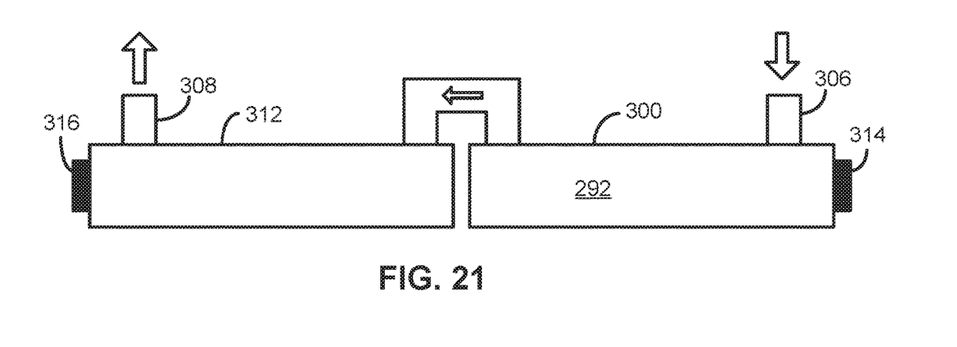
FIG. 21 illustrates how water purifiers in series may be used to increase disinfection.

FIG. 21 illustrates how water purifiers 310 and 312 in series may be used to increase disinfection. UVC LEDs 314 and 316 expose the water 292 to the UVC light through transparent windows. The purifiers may be stainless steel with a polished inner wall for reflection. In the example, the first purifier 310 receives the water via the input port 306 and performs 99.9% disinfection. The water is then provided to the second purifier 312 to deliver water at the output port 308 with 99.9999% disinfection. Additional purifiers may be added in series. Purifiers may also purify in parallel, as shown in FIG. 10, for a higher throughput. Such parallel purifiers may be connected in series with another set of parallel purifiers.

Having described the invention in detail, those skilled in the art will appreciate that, given the present disclosure, modifications may be made to the invention without departing from the spirit of the inventive concept described herein. In particular, different features and components of the different devices described herein may be used in any of the other devices, or features and components may be omitted from any of the devices. A characteristic of, for example, the optic, described in the context of one embodiment, may be applicable to any embodiment. Suitable materials described for a particular component in a particular embodiment may be used for other components, and/or in other embodiments. Therefore, it is not intended that the scope of the invention be limited to the specific embodiments illustrated and described.

What is being claimed is:

1. A water disinfection vessel comprising:
an inner wall of the vessel that reflects light;
a first ultraviolet (UV) light emitting diode (LED) injecting UV light into the vessel;
a first optical detector detecting a transparency of water in the vessel, wherein the transparency is related to impurities in the water;
a second LED that emits non-UV light of a wavelength that is absorbed by microbes in the water, wherein the first optical detector detects light from the second LED that passes through the water to detect absorption of light by the microbes;
a controller circuit configured to receive signals from the first optical detector to determine the transparency of the water; and
the controller circuit configured to control a UV dosage from the first UV LED based, at least in part, on the transparency of the water.

2. The vessel of claim 1 further comprising a second optical detector positioned to detect a light output of the first UV LED, without the light from the first UV LED passing through the water, to generate a baseline signal related to an output power of the first UV LED, and wherein the controller circuit is configured to use the signals from the first optical detector and the second optical detector to determine the transparency of the water to UV light.

3. A water disinfection vessel comprising:
an inner wall of the vessel that reflects light;
a first ultraviolet (UV) light emitting diode (LED) injecting UV light into the vessel;
a first optical detector detecting a transparency of water in the vessel, wherein the transparency is related to impurities in the water;
a controller circuit configured to receive signals from the first optical detector to determine the transparency of the water; and
the controller circuit configured to control a UV dosage from the first UV LED based, at least in part, on the transparency of the water,
wherein the first optical detector detects UV light, wherein the first optical detector is positioned in the vessel remotely from the first UV LED, and wherein the first optical detector detects the light from the UV LED that passes through the water to measure the transparency of the water to UV light.

4. The vessel of claim 3 further comprising a second optical detector positioned to detect a light output of the first UV LED, wherein an optical path length from the first UV LED to the first optical detector is at least twice the optical path length from the first UV LED to the second optical detector, and wherein the controller circuit is configured to use the signals from the first optical detector and the second optical detector to determine the transparency of the water to UV light.

5. The vessel of claim 4 wherein the second optical detector detects light from the UV LED that does not pass through the water.

6. The vessel of claim 4 wherein the second optical detector detects light from the UV LED that passes through the water.

7. A water disinfection vessel comprising:
an inner wall of the vessel that reflects light;
a first ultraviolet (UV) light emitting diode (LED) injecting UV light into the vessel;
a first optical detector detecting a transparency of water in the vessel, wherein the transparency is related to impurities in the water;
a controller circuit configured to receive signals from the first optical detector to determine the transparency of the water; and
the controller circuit configured to control a UV dosage from the first UV LED based, at least in part, on the transparency of the water,
wherein the first optical detector detects light from the first UV LED, and
wherein the controller circuit is configured to receive the signals from the first optical detector and generate a warning signal if the first UV LED is not working properly.

8. The vessel of claim 7 further comprising a second LED that emits non-UV light of a wavelength that is absorbed by microbes in the water, wherein a second optical detector detects light from the second LED that passes through the water to detect absorption of light by the microbes.

9. The vessel of claim 8 further comprising a third optical detector positioned to detect a light output of the second LED, without the light from the second LED passing through the water, to generate a baseline signal related to an output power of the second LED, and wherein the controller circuit is configured to use the signals from at least the second optical detector and the third optical detector to determine the transparency of the water to the non-UV light.

10. The vessel of claim 8 further comprising a third optical detector positioned to detect a light output of the second LED, wherein an optical path length from the second LED to the second optical detector is at least twice the optical path length from the second LED to the third optical detector, and wherein the controller circuit is configured to use the signals from at least the second optical detector and the third optical detector to determine the transparency of the water to light emitted by the second LED.

11. The vessel of claim 10 wherein the third optical detector detects light from the second LED that does not pass through the water.

12. The vessel of claim 10 wherein the third optical detector detects light from the second LED that passes through the water.

13. The vessel of claim 7 wherein the vessel comprises a transparent liner and an outer shell, and wherein the first UV LED and first optical detector are located between the liner and the outer shell.

14. The vessel of claim 7 wherein the inner wall of the vessel that reflects light uses TIR to reflect the light.

15. The vessel of claim 14 wherein the inner wall is transparent.

16. The vessel of claim 7 wherein the inner wall of the vessel is coated with a reflective material.

17. The vessel of claim 7 wherein the first optical detector detects visible light, and wherein the controller circuit turns off the first UV LED when the first optical detector detects ambient light entering the vessel.

18. A water disinfection vessel comprising:
an inner wall of the vessel that reflects light;
a first ultraviolet (UV) light emitting diode (LED) injecting UV light into the vessel;
a first optical detector detecting a transparency of water in the vessel, wherein the transparency is related to impurities in the water;
a controller circuit configured to receive signals from the first optical detector to determine the transparency of the water; and
the controller circuit configured to control a UV dosage from the first UV LED based, at least in part, on the transparency of the water,
wherein the controller circuit is configured to automatically and periodically energize the first UV LED and detect the signals from the first optical detector.

19. A water disinfection system comprising:
a container for disinfecting water;
a UV LED emitting UV light into the water for disinfecting the water;
an air source for supplying bubbles; and
a motorized stirring mechanism for agitating the water while the air source is supplying bubbles in the water and so as to push the bubbles downward for extending the effective lifetime of the bubbles.

20. The system of claim 19 further comprising one or more baffles in the container.

21. The system of claim 19 wherein the stirring mechanism comprises a propeller located near a top surface of the container, and wherein the air source supplies bubbles near a bottom surface of the container such that the bubbles tend to rise toward the top surface of the container and are pushed back down by action of the propeller.

22. A water disinfection vessel comprising:
an inner wall of the vessel that reflects light, the inner wall being configured to hold water;
a removable cap for sealing a top opening in the vessel for adding and removing the water;
a first ultraviolet (UV) light emitting diode (LED) supported by the cap for injecting UV light into the vessel;
the inner wall having a generally parabolic shape surrounding the UV LED that curves inward towards the UV LED for reflecting light emitted from the UV LED downward into the water; and
a controller circuit in the cap for controlling energization of the UV LED.

23. The vessel of claim 22 further comprising a switch on the cap, wherein the controller circuit turns on the UV LED for a time after the switch is turned on.

24. The vessel of claim 22 wherein a light distribution of the UV LED is generally Lambertian, and the generally parabolic shape of the inner wall directs substantially horizontal light emitted from the UV LED downward into the water.

25. The vessel of claim 22 further comprising an outer shell, wherein the inner wall is insulated from the outer shell.

26. The vessel of claim 22 wherein the inner wall comprises glass.

* * * * *